United States Patent [19]
Krulitsch et al.

[11] Patent Number: 4,737,285
[45] Date of Patent: Apr. 12, 1988

[54] HORIZONTAL-TYPE FILTER PRESS

[75] Inventors: Dieter Krulitsch, Bad Münster am Stein; Olaf Trieb, Münster-Sarmsheim, both of Fed. Rep. of Germany

[73] Assignee: Seitz Enzinger Noll Maschinenbau Aktiengesellschaft, Mannheim, Fed. Rep. of Germany

[21] Appl. No.: 871,080

[22] Filed: Jun. 5, 1986

[30] Foreign Application Priority Data

Jun. 5, 1985 [DE] Fed. Rep. of Germany ....... 3520171

[51] Int. Cl.[4] .......................... B01D 25/12; B30B 7/02
[52] U.S. Cl. ..................................... 210/230; 210/224; 210/399; 100/196; 100/199
[58] Field of Search ................................ 210/224–231, 210/244–246, 398, 399; 100/56, 58, 59, 113, 194–199

[56] References Cited

U.S. PATENT DOCUMENTS

| | | | |
|---|---|---|---|
| 1,852,371 | 4/1932 | Raymond et al. | 210/226 X |
| 4,081,380 | 3/1978 | Johnson | 210/225 |
| 4,392,956 | 7/1983 | Vogel | 210/224 |

FOREIGN PATENT DOCUMENTS

| | | | |
|---|---|---|---|
| 2826781 | 12/1979 | Fed. Rep. of Germany . | |
| 374377 | 8/1939 | Italy | 210/185 |

*Primary Examiner*—Peter Hruskoci
*Assistant Examiner*—W. Gary Jones
*Attorney, Agent, or Firm*—Becker & Becker, Inc.

[57] ABSTRACT

A horizontal-type filter press having a protective casing that surrounds at least the filter unit, including the support therefore. This protective casing prevents any leakage that might occur from the filter unit during filtration from adversely affecting operating personnel, from contaminating the filter unit, and from attracting insects or other animals. For the opened state of the filter press, the protective casing can be completely removed at least from the region of the filter elements of the filter unit, especially for being able to work on the filter elements, for providing an unobstructed exchange of the filter aids, and/or for the removal of usable or nonusable filter cakes.

11 Claims, 2 Drawing Sheets

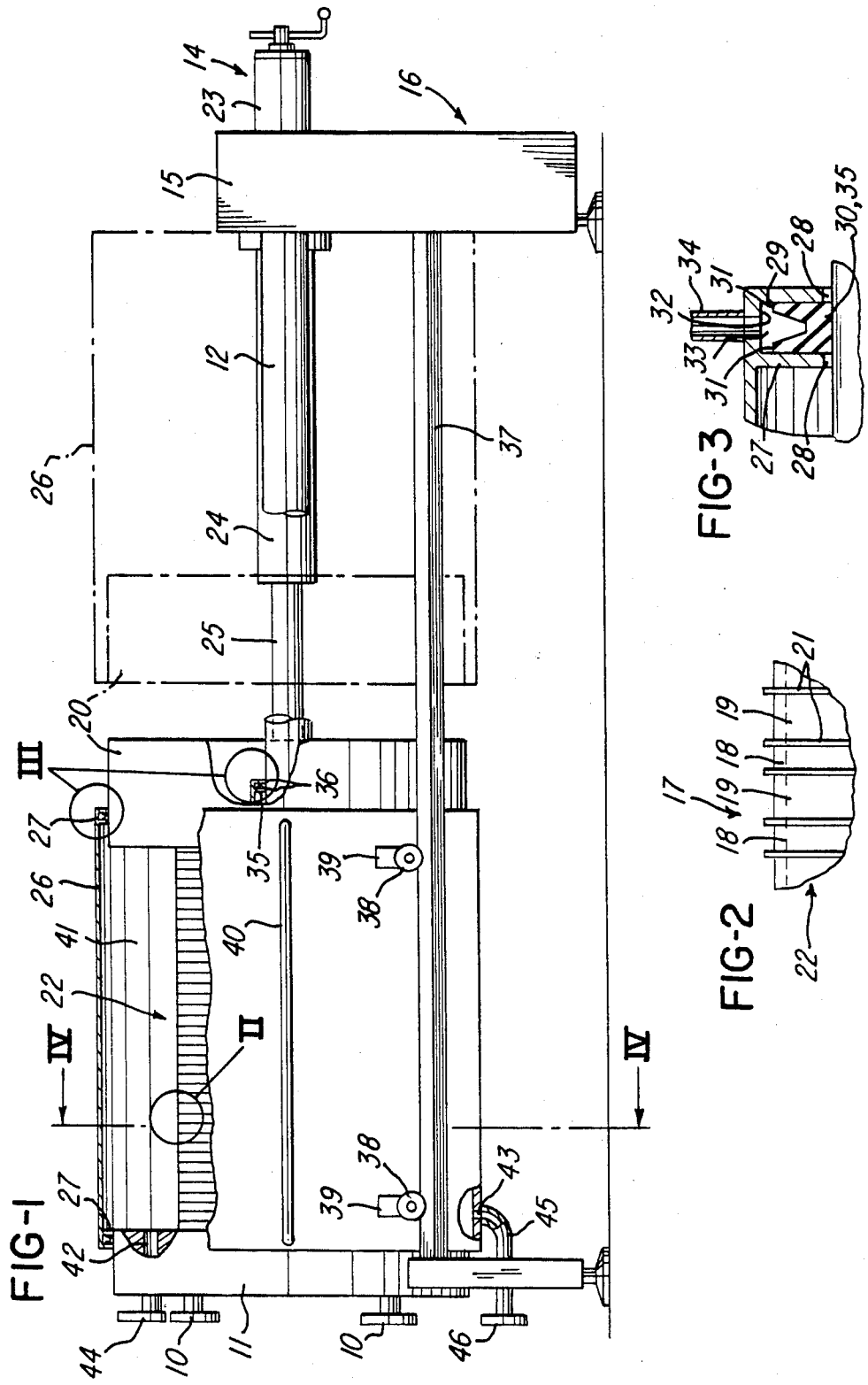

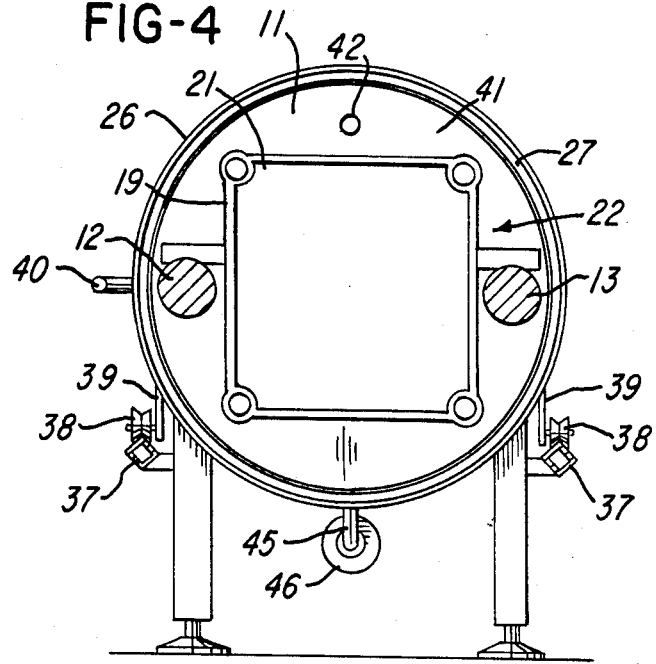

HORIZONTAL-TYPE FILTER PRESS

BACKGROUND OF THE INVENTION

1. Field of the Invention

The present invention relates to a horizontal-type filter press having a head that is connected via crossbeams to a member of a support frame, with such member including a closing mechanism. The filter press also includes a filter unit that is disposed between the head and the member of the support frame, is supported on the crossbeams, and comprises filter elements, filter aids, and a movable press cover upon which the closing mechanism acts.

2. Description of the Prior Art

Filter presses of the aforementioned general type serve for clarifying filtration, sterilizing filtration, or residue filtration of liquids. Such filter presses are used, for example, in the chemical and pharmaceutical industries, the beverage industries, and also have other industrial applications.

In such filter presses, depending upon the filtration that is to be undertaken, filter aids are used that act as depth filters or surface filters. Depth filters are, for example, filter sheets, whereas surface filters include carrier sheets, filter cloths, etc. with carrier sheets being suitable for alluvial filtration and residue filtration. In the filter unit of a filter press, such filtering aids are placed between filter elements, as disclosed in the filter press of German patent No. 28 26 781. By means of a filter press closing mechanism that acts upon the filter unit, the filter aids are brought into the sealed state with the press edges that are disposed at the associated filter elements. Although the sealed state achieved in this manner for the filter unit suffices for a given filtration process, due to the properties of the material of the filter aids such a sealed state is not free of leakage. During the filtration of strong-smelling or toxic liquids, or liquids that contain solvents, leakage that occurs at the filter unit leads to the impairment of the health of operating personnel, and also leads to contamination of the filter unit, which necessitates additional cleaning operations. However, leakages that occur during the filtration of, for example, wine, fruit juices, or other liquids, also cause problems in that such leakage attracts insects or gnats, thus annoying the operators. The aforementioned contamination, which results in the formation of crust, furthermore makes it difficult to open the filter unit following the filtration operation. Such opening of the filter unit is necessary in order to replace used-up filter aids or to remove the filter cakes that are formed on the carrier sheets, filter cloths, etc. To accomplish this, the opened filter unit must be freely accessible.

An object of the present invention is to provide a filter press during the operation of which adverse impacts for the operating personnel caused by leakage at the filter unit are precluded by technical means that assure the free accessibility of an opened filter unit.

BRIEF DESCRIPTION OF THE DRAWINGS

This object, and other objects and advantages of the present invention, will appear more clearly from the following specification in conjunction with the accompanying schematic drawings, in which:

FIG. 1 is a side view of one exemplary embodiment of the inventive filter press illustrated in the closed state with a partially broken away protective casing and filter unit;

FIG. 2 is an enlarged partial view of the dot-dash-encircled region II of FIG. 1;

FIG. 3 is an enlarged partial view of the dot-dash-encircled regions III of FIG. 1; and FIG. 4 is a view that shows a vertical section of the filter press of FIG. 1 taken along the line IV—IV thereof.

SUMMARY OF THE INVENTION

The filter press of the present invention is characterized primarily in that a protective cover or casing is provided that is disposed at a distance from the filter unit; in the closed state of the filter press, while maintaining this spacing from the filter unit, the protective casing surrounds at least the filter unit, and the support therefore, in a gastight and liquid-tight manner; in the open state of the filter press, the protective casing is movable in such a way that it can be removed at least from the region of the filter elements of the filter unit.

The advantages achieved with the present invention consist particularly therein that by providing the protective casing, the adverse effects upon the operators previously caused by the leakiness of the filter unit are avoided. In addition, by being able to remove the protective casing out of the region of the filter elements of the filter unit for the open state of the filter press, there is assured that free access to the filter elements exists for being able to work on the opened filter unit. In addition, due to the presence of the tightly sealed protective casing, insects and other animals are no longer attracted. Finally, by the appropriate supply and withdrawal of rinsing fluid to the space enclosed by the protective casing, the filter unit can be kept free of contamination and crusting, so that there is no longer a need to manually clean the filter unit.

Further advantageous features will be described subsequently.

DESCRIPTION OF PREFERRED EMBODIMENTS

Referring now to the drawings in detail, the horizontal-type filter press illustrated in FIG. 1 has a head 11 that is provided with connections 10 to allow liquid to enter and exit. The head 11 is connected via crossbeams 12 and 13 with a member 15 of a support frame 16 that is placed upon the ground or floor; the member 15 is provided with a closing mechanism 14. The crossbeams 12 and 13 extend in the same plane (see FIG. 2) on both sides of the filter press. In the space between the crossbeams 12 and 13, a movable press cover 20 and the filter elements 17, which can comprise filter plates 18 or a combination of filter plates 18 and filter frames 19, are supported on the crossbeams 12 and 13 via support elements. Respective filter aids, for example carrier sheets 21, are placed between the filter elements 17, for example a combination of filter plates and filter frames. Together with the carrier sheets 21 and the movable press cover 20, the filter elements 17 form the filter unit 22. In the closed state of the filter press, this filter unit 22 is under the influence of the closing mechanism 14, which includes, for example, a hydraulic closing mechanism 23 that has a closing cylinder 24 and a piston rod 25. The latter acts on the press cover 20 of the filter unit 22, and is movably connected therewith via an engaging piece.

The filter unit 22, which in FIG. 1 is illustrated in the closed state of the filter press, is surrounded by a protective cover or casing 26, with an intermediate gap or space being maintained between the filter unit 22 and the protective casing 26. The latter is in the form of a tubular, hollow body that also surrounds the regions of the crossbeams 12 and 13, upon which the filter unit 22 is supported (see FIG. 4). Both ends of the protective casing 26 are provided with an annular bead 27 having a circular opening 28. Each opening 28 is concentric to the inner periphery of the protective casing 26, with the center of each opening coinciding with the longitudinal axis of the filter unit 22. The wall of each opening 28 is provided with an annular slot or groove 29 that accommodates a sealing ring 30 (see FIG. 3). The sealing ring 30, which can be an O-ring, a lip gasket, or a similar static sealing member, is preferably a sealing element that can be shifted from an inoperative rest position, by means of a pressure medium such as compressed air, into a sealing position with the associated sealing surface. Each time the pressure medium is shut off, the sealing element returns to the rest position, either automatically or under the effect of pressure, for example by connecting the pressure chamber 33 to a vacuum. This pressure chamber 33 is formed between the base 32 of the annular groove 29, and that peripheral region of the sealing element that is located in the annular groove 29 and is provided with sealing lips 31 that rest sealingly against the sides of the annular groove 29. The pressure chamber 33 communicates via a through-bore with a connector 34. For each crossbeam passage 36 that is disposed in the press cover 20, there is provided a sealing ring 35 that has the same function as the sealing ring 30, yet is provided with smaller external dimensions. These sealing rings 35 provide for gastight and liquid-tight sealing of the press cover 20 relative to the crossbeams 12 and 13.

The connectors 34 of a given pressure chamber 33, one of which is associated with each of the sealing rings 30 and 35, can be rigidly or flexibly connected to a common, non-illustrated distributing mechanism that can be connected or disconnected via a flexible line to a source of, for example, compressed air, such as the operational supply system, or can be connected and disconnected directly via a separate flexible line to the aforementioned source of compressed air.

At one end of the protective casing 26, the sealing surface associated with the sealing ring 30 that is accommodated in the annular groove 29 of the annular bead 27 is provided on the head 11 of the filter press, while at the other end of the protective casing 26, the sealing surface associated with the sealing ring 30 in the annular groove 29 of the annular bead 27 is provided on the outer periphery of the press cover 20. The diameter of the latter sealing surface also includes the further outer peripheral region of the press cover 20 disposed beyond the sealing surface. However, this outer peripheral region of the press cover 20 disposed beyond the sealing surface can also have a smaller diameter than the diameter provided for the sealing surface. So that when the protective casing 26 is shifted, the sealing surfaces provided on the head 11 and on the press cover 20 for the sealing rings 30 are not damaged by the walls of the openings 28, the diameter provided for these openings is greater than the predetermined diameter for the sealing surfaces.

In the region below each of the crossbeams 12 and 13, as can be seen in FIGS. 1 and 4, there is disposed on the support frame 16 a respective guide rail 37 of a profiled pipe, with each guide rail 37 being aligned with the associated crossbeam 12 or 13. Via two sets of rollers 38, the protective casing 26 is shiftably mounted and guided on the guide rail 37 in the longitudinal axis of the filter unit. The rollers 38 rotate along a horizontal axis, and with respect to each of the associated guide rails 37, a roller is disposed near each end region of the protective casing 26. Each of the rollers 38 is mounted on the outer wall of the protective casing 26 by means of a bracket 39. The two rollers 38 disposed in a given end region of the protective casing 26 for the two guide rails 37, which extend at the same height from the head 11 all the way to the member 15, are disposed across from one another. A handle 40 is secured to one or both sides of the support frame 16 on the outer wall of the protective casing 26 at the height of the crossbeams 12 and 13. After first venting the pressure chambers 33 associated with the sealing rings 30 and 35, and after return of the sealing rings to their rest positions, the protective casing 26 can be shifted by an operator out of the operative position shown in solid lines in FIG. 1, into the inoperative position shown by dot-dash lines in FIG. 1. In this inoperative position, the press cover 20 can assume a position within the protective casing 26, as indicated by dot-dash lines in FIG. 1.

The space 41, which is formed by maintaining a gap between the protective casing 26 and the filter unit 22, is provided at that location disposed at the top above the top of the filter unit with an inlet 42, and is provided at a low location below the bottom of the filter unit 22 with an outlet 43. The inlet 42 is associated with a connector 44 that in turn is associated with the head 11 and is connected to a non-illustrated line via which air, a special rinsing gas or liquid, or steam can be supplied. The outlet 43 is part of a discharge line 45 connected to the bottom of the protective casing 26. This discharge line 45 communicates with a non-illustrated continuing system via a quickly releasable coupling, with FIGS. 1 and 4 showing the coupling part 46 that is connected to the discharge line 45. Via the discharge line 45 and the system associated therewith, the liquid and/or gas that accumulates within the protective casing 26 during operation of the filter press is removed, with rinsing gas and/or liquid, steam, etc. being supplied via the line and connector 44. Only after the liquid and/or gas has been removed, i.e. when there no longer exists the danger that the operator could be adversely affected thereby, can the sealed state for the gas and liquid sealing of the sealing rings 30, 35 be eliminated, can the coupling at the continuing discharge line be subsequently released, can the compressed air line that is flexibly connected with the pressure chambers 33 be released, and can the protective casing 26 be shifted into the dot-dash position illustrated in FIG. 1 in order to expose the filter unit 22. However, in the simplest case, it would also be possible, for the emptying of the liquid or other fluid that accumulates in the protective casing 26, to connect a valve not only at the connector 44 but also at the discharge line 45 in order, when the valves have been manually opened, to be able to undertake emptying into a tank or other container. This is possible where wine, juice, or a similar food stuff is being filtered.

It should also be noted that when the filter press is closed, and the discharge line 45 is closed, an overpressure which precludes leakage can be maintained in the space 41 by means of a pressurized gas, such as air, inert gas, etc., that is supplied via the line 44. This pessurized gas can be a gas such as air, carbon dioxide, nitrogen, etc. that is not harmful to the operator, and possibly conforms to the temperature of the liquid that is to be filtered, thus making it unnecessary to rinse the protective casing 26 prior to removing the latter.

The present invention is, of course, in no way restricted to the specific disclosure of the specification and drawings, but also encompasses any modifications within the scope of the appended claims.

What we claim is:

1. A horizontal-type filter press having a closed state and an open state as well as having a head that is connected via crossbeams to a member of a support frame, with said member including a closing mechanism; said filter press also including a filter unit that is disposed between said head and said member, is supported on said crossbeams, and comprises filter elements, filter aids, and a movable press cover upon which said closing mechanism acts to open and close said filter unit and hence said filter press, which further comprises:

a protective casing that is disposed at a distance from said filter unit; in the closed state of said filter press, while maintaining said spacing from said filter unit, said protective casing surrounds at least said filter unit, and said support therefor, in a gastight and liquid-tight manner; in the open state of said filter press, said protective casing being movable such that it can be removed at least from the region of said filter elements of said filter unit;

said protective casing being in the form of a tubular hollow body having two ends; in the closed state of said filter press, one of said ends being near said head of said filter press, and the other end being near said press cover of said filter unit; each of said ends of said tubular protective casing being provided with an inwardly directed annular bead, each of which has a circular opening of same size having a diameter which is less than an inner diameter of said protective casing, with each of said openings being disposed concentric to the inner periphery of said tubular protective casing; each of said annular beads being provided with an annular groove that accommodates a respective sealing ring; said head being provided with a first sealing surface against which one of said sealing rings is adapted to rest in the closed state of said filter press, and said press cover being provided with a second sealing surface against which the other of said sealing rings is adapted to rest in the closed state of said filter press, so that an interaction exists between said sealing rings on the one hand, and said sealing surfaces on the other hand, effecting said gastight and liquid-tight surrounding of said filter unit by said protective casing in the closed state of said filter press.

2. A filter press according to claim 1, in which said press cover is provided with passage means for said crossbeams, with each of said passage means having an annular groove that accommodates a sealing ring that is adapted to rest against one of said crossbeams.

3. A filter press according to claim 2, which includes means for supplying pressure medium to each of said sealing rings, with the latter being movable by said pressure medium from an inoperative rest position into a sealing position where said sealing rings rest against said sealing surfaces of said head and press cover, and against said crossbeams; when said pressure medium is no longer supplied to said sealing rings, the latter are returnable to said rest position.

4. A filter press according to claim 3, in which said pressure medium is pressurized gas.

5. A filter press according to claim 4, in which said pressure medium is compressed air.

6. A filter press according to claim 1, in which diameter of said circular openings is greater than diameter of said sealing surfaces, of said head and said press cover, against which said sealing rings are adapted to rest.

7. A filter press according to claim 6, in which an outer surface of said press cover beyond said sealing surface thereof has an outer periphery with a diameter prescribed for said sealing surface.

8. A filter press according to claim 1, in which said protective casing is movably mounted and guided on said support frame of said filter press to effect said removal of said protective casing from the region of said filter elements of said filter unit in the open state of said filter press.

9. A filter press according to claim 8, in which an outer wall of said protective casing is provided with bracket means on which are mounted rollers; and which includes a pair of guide rails provided on said support frame below said crossbeams, with said protective casing being movably mounted and guided on said guide rails via said rollers.

10. A filter press according to claim 1, which includes inlet means that communicate with an upper portion of the space formed by said maintained spacing between said protective casing and said filter unit, and which includes outlet means that communicate with a lower portion of said space.

11. A filter press according to claim 10, in which said inlet means is a supply connector provided on said head, and said outlet means is a discharge line disposed on the bottom of said protective cover.

* * * * *